US008977627B1

(12) United States Patent
Vijayanarasimhan et al.

(10) Patent No.: US 8,977,627 B1
(45) Date of Patent: Mar. 10, 2015

(54) FILTER BASED OBJECT DETECTION USING HASH FUNCTIONS

(75) Inventors: Sudheendra Vijayanarasimhan, Mountain View, CA (US); Jay Yagnik, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 531 days.

(21) Appl. No.: 13/286,963

(22) Filed: Nov. 1, 2011

(51) Int. Cl.
*G06F 7/00* (2006.01)
*G06K 9/46* (2006.01)

(52) U.S. Cl.
USPC .......................................... 707/747; 382/190

(58) Field of Classification Search
None
See application file for complete search history.

(56) References Cited

U.S. PATENT DOCUMENTS

| 7,257,586 | B2 * | 8/2007 | Lau et al. ............................... 1/1 |
| 7,761,466 | B1 * | 7/2010 | Eshghi ........................... 707/772 |
| 8,055,078 | B2 * | 11/2011 | Choi et al. .................... 382/209 |
| 8,224,849 | B2 * | 7/2012 | Li et al. .......................... 707/780 |
| 2008/0288728 | A1 * | 11/2008 | Farooqui et al. .............. 711/149 |

OTHER PUBLICATIONS

A. Maturi, et al. A New Weighted Rank Correlation. In J. Mathematics and Statistics, Oct. 1, 2008.*
D. Bhat, et al. Ordinal Measures for Visual Correspondence. In CVPR'96. 1996 IEEE.
J. Friedman. An Overview of Predictive Learning and Function Approximation. Technical Report 112, Sep. 1994. Laboratory for Computational Statistics. Department of Statistics, Stanford University. In From Statistics to Neural Networks 1994.
P. Diaconis, et al. Spearman's footrule as a measure of disarray. Stanford, California and Murray Hill, N.J. Received Aug. 1976. Revised Apr. 1977. In J. Roy. Statistical Society 1977.
J. Pinto Da Costa, et al. A Weighted Rank Measure of Correlation. In Australian New Zealand Journal of Statistics 47(4), 2005, 515-529.
G. Shieh. A weighted Kendall's tau statistic. In Statistics & Probability Letters 39 (1998) 17-24.
M. Ozuysal, et al. Fast Keypoint Recognition in Ten Lines of Code. In CVPR 2007.
Y. Lifshits, et al. Combinatorial Algorithms for Nearest Neighbors, Near-Duplicates and Small World Design. In SODA 2009.
D. Tschopp, et al. Approximate nearest neighbor search through comparisons. In ArXiv preprint Sep. 11, 2009.
K. Eshghi, et al. Locality sensitive hash functions based on concomitant rank order statistics. In 14th ACM SIGKDD Conference on Knowledge Discovery & Data Mining (KDD'08), Aug. 2008. Posting Date Jul. 6, 2008.
A. Broder. On the resemblance and containment of documents. In Sequences 1997.
A. Broder, et al. Min-wise independent permutations. In STOC 1998.

(Continued)

*Primary Examiner* — Sangwoo Ahn
(74) *Attorney, Agent, or Firm* — Amin, Turocy & Watson, LLP

(57) ABSTRACT

This disclosure relates to filter based object detection using hash functions. A hashing component can compute respective hash values for a set of object windows that are associated with an image to be scanned. The hashing component can employ various hash functions in connection with computing the hash values, such as a winner takes all (WTA) hash function. A filter selection component can compare the respective hash values of the object windows against a hash table of object filters, and can select one or more object filters for recognizing or localizing at least one of an object within the image as a function of the comparison.

36 Claims, 11 Drawing Sheets

(56) References Cited

OTHER PUBLICATIONS

S. Baluja, et al. Boosting Sex Identification Performance. In IJCV 2007.
M. Ozuysal, et al. Feature harvesting for tracking-by-detection. In ECCV 2006.
O. Pele, et al. Robust real time pattern matching using bayesian sequential hypothesis testing. In PAMI 2008.
R. Zabih, et al. Non-parametric local transforms for computing visual correspondence. In ECCV 1994.
V. Lepetit. Keypoint recognition using randomized trees. In PAMI 2006.
P. Indyk, et al. Approximate nearest neighbors: towards removing the curse of dimensionality. In STOC 1998, Dallas, Texas. ACM 1998.
Y. Weiss, et al. Spectral Hashing. In NIPS 2009.
R. Lin, et al. SPEC Hashing: Similarity Preserving algorithm for Entropy-based Coding. In CVPR 2010.
D. Lowe. Object recognition from local scale-invariant features. Proceedings of the International Conference on Computer Vision, Corfu (Sep. 1999). In IJCV 1999.
B. Wang, et al. Large-scale duplicate detection for web image search. In ICME 2006.
X.J. Wang, et al. Annosearch: Image autoannotation by search. In CVPR 2006.
S. Winder, et al. Picking the best Daisy. In CVPR 2009.
D. Nister, et al. Scalable recognition with a vocabulary tree. In CVPR 2006.
E. Tola, et al. A fast local descriptor for dense matching. CVPR 2008.
E. Tola, et al. Daisy: an Efficient Dense Descriptor Applied to Wide Baseline Stereo. IEEE Transactions on Pattern Analysis and Machine Intelligence, vol. 32, No. 5, May 2010, 815-830. In PAMI 2010.
R.E. Fan, et al. Liblinear: A Library for Large Linear Classification. Journal of Machine Learning Research 9 (2008) 1871-1874.
K. Yu, T. Zhang, Y. Gong. Nonlinear Learning using Local Coordinate Coding. In NIPS 2009.
J. Zhang, et al. Local Features and Kernels for Classification of Texture and Object Categories: A Comprehensive Study. International Journal of Computer Vision 2007.
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE13 Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

\* cited by examiner

FILTER BASED OBJECT DETECTION USING HASH FUNCTIONS

TECHNICAL FIELD

This disclosure generally relates to systems and methods that facilitate object detection and recognition in digital images.

BACKGROUND

People have the ability to quickly identify and distinguish between a seemingly limitless number of objects with little effort. Even when viewpoint, size, or scale of an image of an object is varied, people are typically able to recognize the object rather quickly. Individuals can even recognize objects in images when they are partially obstructed from view. However, obstacles such as differing viewpoints, sizes, scales, and partial obstruction of objects in images haven proven to be difficult and computationally expensive for computer recognition systems.

A technique that has been employed for object detection in images consist of analyzing pieces of an image by running object filters across an image in a sliding window fashion, computing the byproduct of the object filters with the underlying image at every location in the image, and using the largest value, or value set, across a particular threshold for object detection. In addition, images to be analyzed for object detection can be of poor quality, and are rarely captured at a uniform size, scale, or viewpoint. As a consequence, computer recognition systems often have to learn object filters for different viewpoints, and convolve the object filters on an image pyramid during object detection.

Typically, anywhere from several hundred to several thousand object filters can be used for object detection or localization. It can be readily appreciated that computing the byproduct of up to several thousand object filters for multiple viewpoints at every location on an underlying image can require significant time and computational resources. The amount of resources required in such computer recognition systems can be limiting. For example, such systems may have difficulty in scaling for multiple object categories.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

According to an aspect of the subject innovation, systems and methods for filter based object detection using hash functions are disclosed. An image analyzer includes a hashing component that computes respective hash values for a set of object windows that are associated with an image to be scanned. The hashing component can employ various hash functions in connection with computing the hash values, such as for example a winner takes all (WTA) hash function. A filter selection component compares the respective hash values of the object windows against a hash table of object filters, and selects one or more object filters for recognizing or localizing at least one of an object within the image as a function of the comparison.

In an embodiment, an image analyzer includes a hashing component that computes respective hash values for a set of object windows associated with an image to be scanned. The hashing component can include a winner takes all (WTA) hash component that transforms an input feature space into binary codes such that Hamming distance in a resulting space correlates with rank similarity measures, and a ranking component that biases rank embeddings to be sensitive to elements at a head of a rank list. A filter selection component compares the respective hash values of the object windows against a hash table of object filters, and selects one or more object filters for recognizing or localizing at least one of an object within the image as a function of the comparison.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
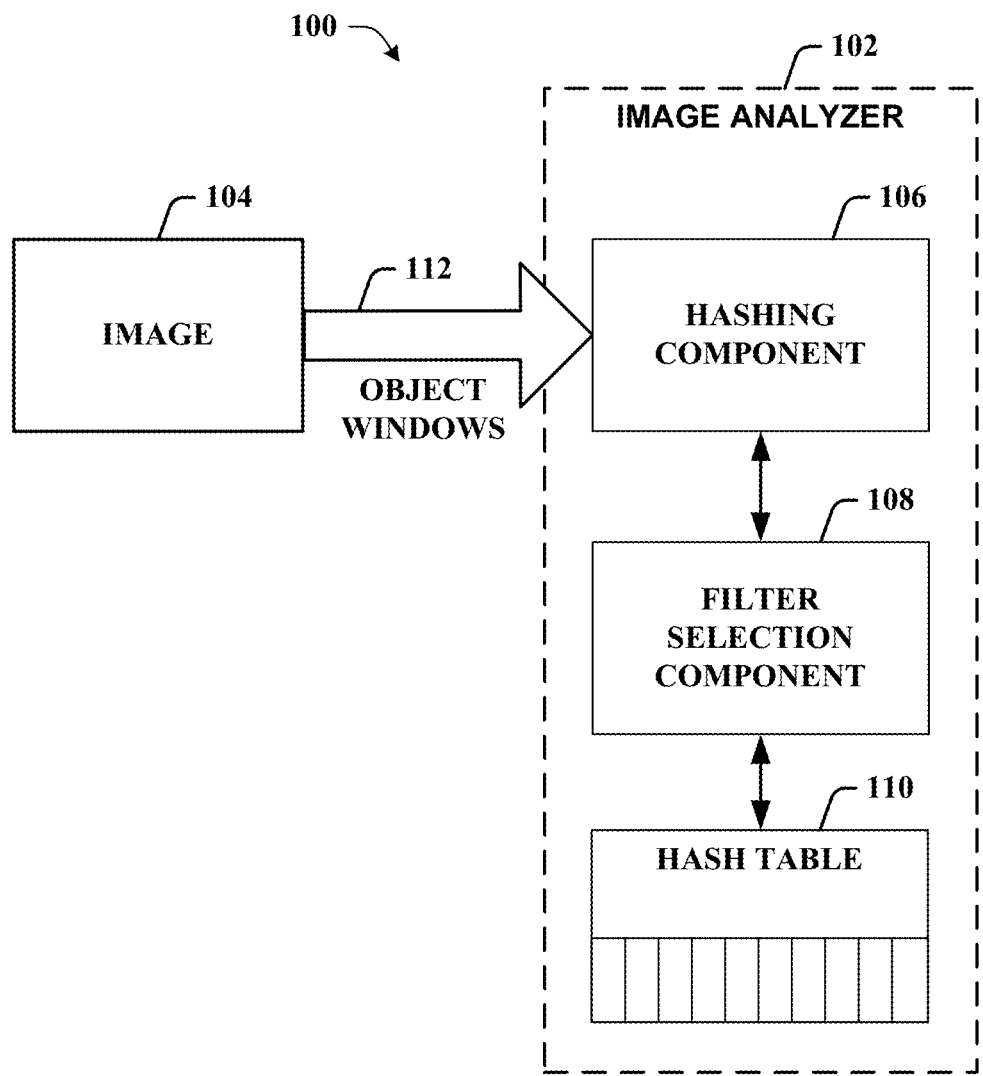
FIG. 1 illustrates an example system for filter based object detection using hash functions in accordance with various aspects described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, techniques for object detection that analyze pieces of an image by running object filters across an image in a sliding window fashion for multiple viewpoints, compute the byproduct of the object filters with the underlying image at every location in the image, and use the largest value, or value set, across a particular threshold for object detection can be computationally expensive.

One non-limiting implementation of the innovation provides efficient and accurate object or feature recognition or localization in images. The implementation reduces computational cost by obtaining image windows for particular features that would be convolved with object filters from images, computing hash values for the object windows, and using the hash values to directly lookup object filters stored in a hash table.

More particularly, in accordance with an embodiment, a hashing component computes respective hash values for a set of object windows that are associated with an image to be scanned, and a filter selection component compares the respective hash values of the object windows against a hash table of object filters, and as a function of the comparison selects at least one of the object filters for recognizing or localizing at least one of an object or feature within the image.
Non-Limiting Examples of Filter Based Object Detection Using Hash Functions Turning now to FIG. 1, illustrated is an example system 100 for filter based object detection using hash functions in accordance with various aspects described in this disclosure. Generally, system 100 can include a memory that stores computer executable components and a processor that executes computer executable components stored in the memory, examples of which can be found with reference to FIG. 11. System 100 includes an image analyzer 102. The image analyzer 102 recognizes or localizes features or objects included in an image 104 (e.g., digital image, picture, etc.). The image analyzer 102 includes a hashing component 106, a filter selection component 108, and a hash table 110. The hashing component 106 obtains, acquires, or otherwise receives a set of object windows (W) 112 associated with the image 104. For example, the image analyzer 102 can determine the set of object windows 112 as a function of the image 104. The hashing component 106 determines, calculates or otherwise computes a set of respective hash values for the set of object windows 112. For instance, if the set of object windows includes a first object window, and a second object window, then the hashing component 106 computes a first hash value for the first object window, and a second hash value for the second object window.

The hashing component 106 can employ various hash functions to calculate the hash values, including, but not limited to, winner takes all (WTA) hashing (discussed in greater detail in connection with FIGS. 2-4), a locality sensitive hashing function, hashing based on random projections, hashing with concomitant statistics, or Similarity Preserving algorithm for Entropy-based Coding (SPEC) hashing (discussed in greater detail in connection with FIG. 5). It is to be appreciated that the particular hash algorithm (e.g., hash function) used can be a function of the object or features that are desired to be localized or recognized.

The filter selection component 108 evaluates, assesses, or otherwise compares the set of respective hash values for the set of object windows against a hash table 110 for object filters. In one implementation, the hash table 110 can map virtually any quantity of object filters. The filter selection component 108 picks, chooses, or otherwise selects at least one of the object filters as a function of the comparison. As an example, if the filter selection component 108 determines that the first hash value in the previous example corresponds to an $N^{th}$ object filter in the hash table 110 (N is an integer), then the filter selection component 108 selects the $N^{th}$ object filter for recognizing or localizing the object or feature associated with the first object window in the image 104. It is to be appreciated that although the hash table 110 is illustrated as being included in the image analyzer 102, such implementation is not so limited. For instance, the hash table 110 can be maintained in a disparate location, wherein the image analyzer 102 accesses the hash table 110 via a network connection.

Figure 2:
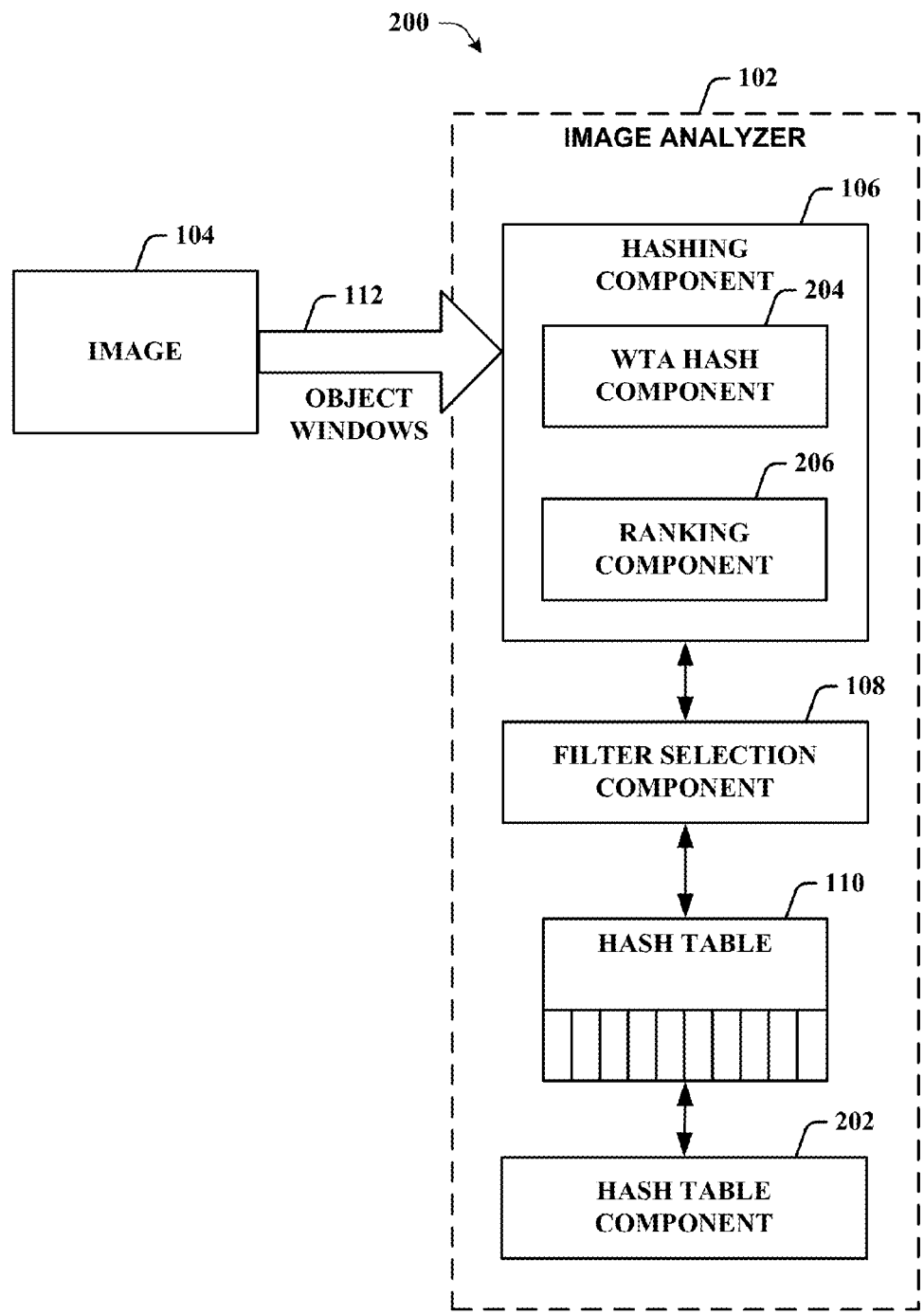
FIG. 2 illustrates an example system for filter based object detection using hash functions in accordance with various aspects described herein.

FIG. 2 illustrates an example system 200 for filter based object detection using hash functions in accordance with various aspects described in this disclosure. The system 200 includes an image analyzer 102 that recognizes or localizes features or objects included in an image 104. The image analyzer 102 includes the hashing component 106, the filter selection component 108, and the hash table 110. The hashing component 106 receives a set of object windows (W) 112 associated with the image 104, and computes a set of respective hash values for the set of object windows 112. The filter selection component 108 compares the set of respective hash values for the set of object windows against the set of hash values corresponding to a set of object filters maintained in the hash table 110. The image analyzer 102 in FIG. 2 also includes a hash table component 202 that saves, maintains, or otherwise stores the object windows in the hash table 110.

The hashing component 106 in FIG. 2 includes a winner takes all (WTA) hash component 204 that facilitates computation of the set of respective hash values for the set of object windows. The WTA hash component 204 transforms an input feature space (e.g., input feature vectors) into binary codes (e.g., hash values) such that a Hamming distance, or Hamming similarity, in a resulting space (e.g., binary codes or hash values) correlates with rank similarity measures. The WTA hash component 204 (or hashing component 106) generates a hash vector by combining a set of hash values corresponding respectively to different input feature vectors. For example, the input feature space can include a set of input feature vectors determined as a function of an object window in the set of object windows 112. The WTA hash component 204 can permutate the input vectors, analyze a first subset of the elements in the respective permutated input vectors, and generate a hash vector by coding an index of a maximum element in the respective first subset of elements for the permutated input vectors (e.g., a K-sized subset of feature dimensions, where K is an integer).

In addition, the hashing component 106 in FIG. 2 includes a ranking component 206 that induces ranking metrics on descriptors for similarity search. The ranking component 206 employs a set of hashed descriptors computed as a function of known descriptors. For example, the ranking component 206 can employ a set of WTA descriptors with respective WTA hash codes computed respectively from a set of raw image pixels descriptors, or a set of Scale-invariant feature transform (SIFT) and Daisy descriptors, each with the hamming distance, in order to determine and/or rank the similarity of a set of disparate images to the image 104, or a segment of the image 104.

Furthermore, the ranking component 206 biases rank embeddings for sensitivity to elements (e.g., indices) at the head of a rank list. The elements of the hash vectors correlate to rank embeddings (e.g., ordinal embeddings) of the input feature space. For example, the ranking component 206 can bias the rank embeddings by altering the size of the subset of feature dimensions (e.g., K). The greater the size of the subset of feature dimensions, the greater the bias is toward the elements at the head of the rank list (discussed in greater detail with reference to FIG. 4). It is to be appreciated that in the context of ranking, agreement among high ranking coefficients in a list can be more important than coefficients further down the list.

Figure 11:
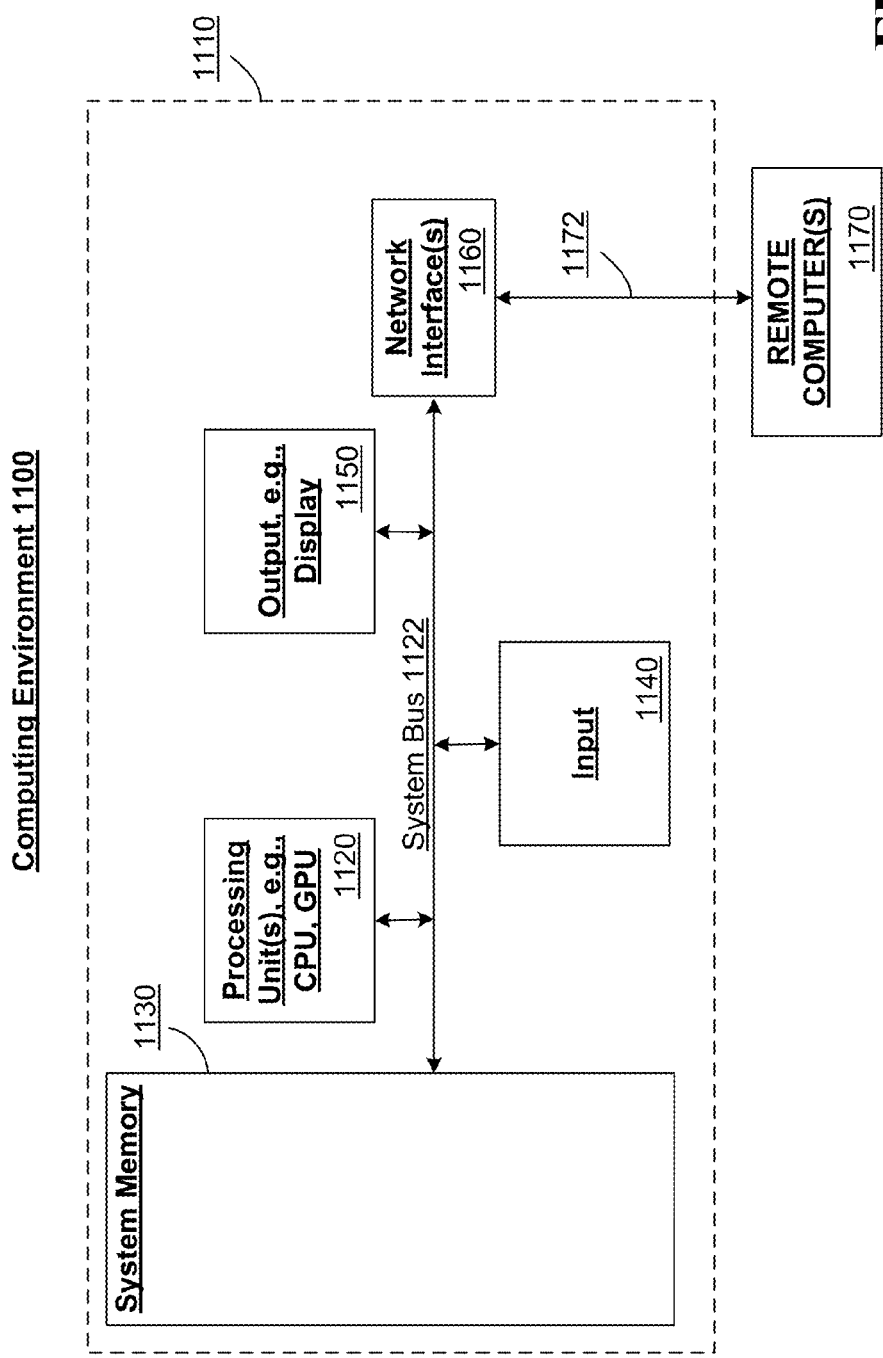
FIG. 11 is a block diagram representing an exemplary non-limiting computing system or operating environment in which the various embodiments may be implemented.

Similar to system 100, generally system 200 can include a memory that stores computer executable components and a processor that executes computer executable components stored in the memory, examples of which can be found with reference to FIG. 11. In addition, it is to be appreciated that the WTA hashing as employed by the WTA hash component 204 is based in part on comparisons of elements, and can be efficiently implemented without computation of floating point units. For example, the processor and/or the memory can be configured as special case hardware that does not compute floating point units, or fixed-point hardware (e.g., fixed-point processor, etc.).

Figure 3:
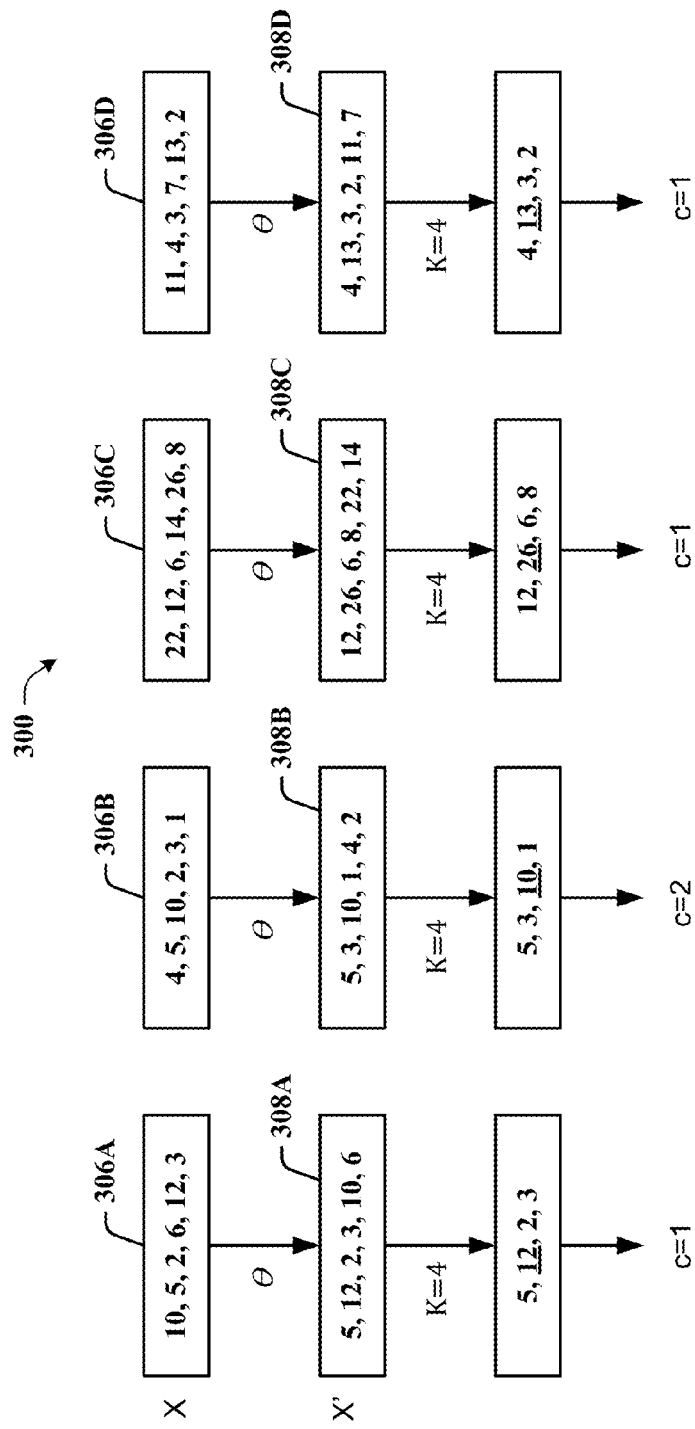
FIG. 3 illustrates an example winner takes all (WTA) hashing in accordance with various aspects described herein.

Referring to FIG. 3, illustrated is an example of winner takes all (WTA) hashing 300 in accordance with various aspects described in this disclosure. As discussed previously, the WTA hash component 204 transforms an input feature space into binary codes such that a Hamming distance in a resulting space correlates with rank similarity measures. Rank similarity measures provide stability to perturbations in numeric values, and provide good indications of inherent similarity, or agreement, between items or vectors being considered. A non-limiting example WTA hashing algorithm, as employed by the WTA hash component 204, is detailed by Algorithm 1, shown below:

WTA Hash
Input: A set of m Permutations $\Theta$, window size K, input vector X.
Output: Sparse vector of codes $C_X$.
1. For each permutation $\Theta_i$ in $\Theta$.
   (a) Permutate elements of X according to $\Theta_i$ to get X'.
   (b) Initialize $i^{th}$ sparse code $c_{xi}$ to 0.
   (c) Set $c_{xi}$ to the index of maximum value in X'(1 ... K)
      i. For j=0 to K−1
         A. If X'(j)>X'($c_{xi}$) then $c_{xi}$=j.
2. $C_X$=[$c_{x0}$, $c_{x1}$, ..., $c_{xm-1}$], C contains m codes, each taking a value between 0 and K−1.
   (Algorithm 1)

Algorithm 1 provides a feature space transformation having a resulting space that is not sensitive to the absolute values of the feature dimensions, but rather on the implicit ordering defined by those values. In effect, the similarity between two points is defined by the degree to which their feature dimension rankings agree. A pair-wise order measure can be defined according to Equation 1 below:

$$PO(X, Y) = \sum_i \sum_{j<i} T((x_i - x_j)(y_i - y_j))$$

where $x_i$ and $y_i$ are the $i^{th}$ feature dimensions in X, Y $R^n$ and T is a threshold function, $$T(x) = \begin{cases} 1 & x > 0 \\ 0 & x \leq 0 \end{cases}.$$

Equation 1 measures the number of pairs of feature dimensions in X and Y that agree in ordering. By regrouping the pair-wise summations with respect to ranks, then the pair-wise order function PO can be rewritten in the following form:

$$PO(X, Y) = \sum_i R_i(X, Y) \quad \text{(Equation 2)}$$

where $$R_i(X,Y)=|L(X,i) \cap L(Y,i)| \quad \text{(Equation 3)}$$

$$L(X,i)=\{j|X(i)>X(j)\} \quad \text{(Equation 4)}$$

Equation 2 groups pair-wise agreement terms by one of the indices in the pair. $R_i(X, Y)$, in Equation 3, measures the ranking agreement for index i with indices that rank below i. Indices of elements in X that are ranked below index I are denoted with L (X, i), in Equation 4. The rank agreement at index i is the cardinality of the intersection of the corresponding L sets from X and Y. For example, to compute PO(X, Y) between a first input vector 306a and a second input vector 306b in the WTA hash 300, the term $R_0(X, Y)$ will measure the size of the intersection for the set of indices smaller than index 0. L(X, 0)={1, 2, 3, 5} are the set of indices in the first input vector 306a that have values smaller than that at index 0, similarly for Y, L(Y, 0)={3, 4, 5} which gives L (X, i)∩L(Y, i)={3, 5} leading to $R_0(X, Y)$=2. Equation 2 rearranges the unique pair-wise summations into intersections of these "less than" lists. The inner summation instead of covering all j<i, now covers all j such that X(j)<X(i), and the result is the same since in both cases the unique pairs (i, j) are covered.

Algorithm 1 outlines a transformation method where the permutations in the algorithm are generated randomly and stored for use by all data points. The transformation method depends on coding multiple partial orderings of a data point as a way to lower bound ranking agreement in case of a match. Essentially, K dimensions are selected from the sample, and the dimension with the highest value in the subset of size K is coded. For example, K can be selected at random and consistent across all samples which gives rise to the notion of permutations.

Equality in the codes $c_i$ implies that the estimate of Equation 1 can or possibly should be increased by K−1. If two vectors X and Y have the same value for output code $c_0$, for example, $c_0$=a, for a window size of K, then X and Y match in K−1 inequalities that state X'(a)>X'(i) and Y'(a)>Y'(i) for all i: 0≤i<K, i≠a. So T((x'$_a$−x'$_i$)(y'$_a$−y'$_i$))=1 for all i: 0≤i<K, i≠a which results in a progressively lower bound on a pair-wise order agreement (e.g., Equation 1) between X and Y as more codes match. This is colloquially referred to as a winner takes all (WTA) hash function, because only the "winner" is being encoding in each subset according to a predetermined criterion (e.g., maximum value). It is to be appreciated that although Algorithm 1 is described with reference to the "winner" being a maximum value, such implementation is not limited. For instance, the "winner" can be an additional or alternative encoding of multiple points based on a partial ordering.

The example WTA hashing 300 includes four six dimensional input vectors (306A-306D), where K=4, $\Theta$=(1, 4, 2, 5, 0, 3). The first input vector 306a and the second input vector 306b are unrelated and result in different output codes (e.g., 1 and 2, respectively). The input third vector 306c is a scaled and offset version of the first input vector 306a (in this case, times 2, then plus 2), and results in the same output code as 306a (e.g., 1). The fourth input vector 306d is a version of the first input vector 306a, wherein each element has been perturbed by 1 (in this case, +1, −1, +1, +1, +1, −1). The elements of the fourth input vector 306d are ranked differently from the first input vector, but the index of the maximum element of the first K (e.g., 4) elements in the fourth input vector 306d (e.g., 1) is the same as the index of the maximum element of the first K (e.g., 4) elements in the first input vector 306a (e.g., 1).

The vectors 306a and 306c satisfy three inequalities, namely X'(1)>X'(0), X'(1)>X'(2), and X'(1)>X'(3). When computing pair-wise order agreement between the vectors 306a and 306c (e.g., Equation 1), these three terms (e.g., inequalities) will add positive contribution. This implies that equality in code $c_i$ adds K−1 to an estimate of PO in Equation 1, effectively acting as a lower bound. If a large number of codes are generated, then the bound becomes tighter as more possible pair combinations are considered.

Furthermore, it can be appreciated that the choice of K leads to different emphasis on pair-wise agreements for indices at the head of the list. For example, consider the degenerate case in which K=n, where n is the dimensionality of the feature vector. Every permutation encodes the global max element, so n−1 inequalities that relate the max element to all the others would be captured. (In general each permutation encodes K−1 inequalities relating to the max within the first K elements of that permutation.) Therefore, K=n puts complete emphasis on the head of the list. In comparison, K=2 does not put bias on the head as all pairs are encoded. Values of K between 2 and n lead to a progressively steeper bias to the head elements The foregoing relationship is analyzed in greater detail with respect to FIGS. 4A and 4B.

Figure 4A:
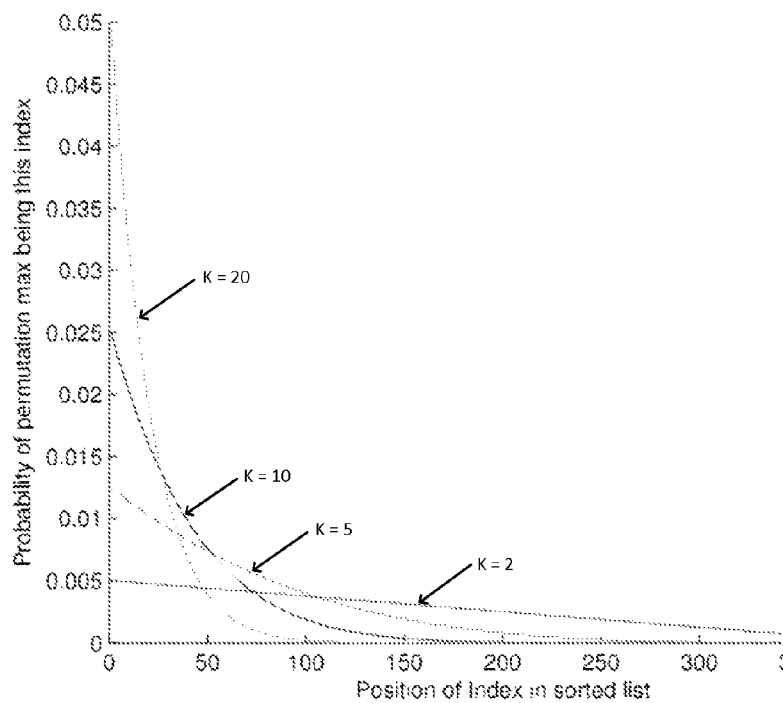
FIG. 4A is an example plot illustrating an example rate of sampling of a predetermined index from a sorted list in accordance with various aspects described herein.
Figure 4B:
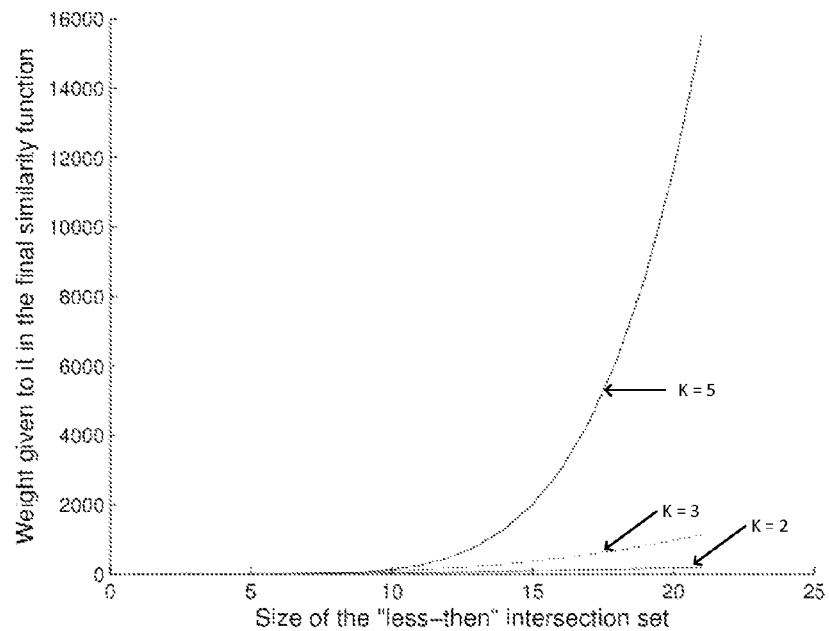
FIG. 4B is an example plot illustrating an example contribution to similarity for different biasing factors in accordance with various aspects described herein.

Turning to FIGS. 4A and 4B, FIG. 4A is a plot illustrating an example rate of sampling of a predetermined index from a sorted list, and FIG. 4B is a graph illustrating a contribution to similarity for a predetermined value of $R_i(X, Y)$ for different values of K. As discussed with reference to FIG. 3, a window size K influences the distribution of which indices from an original vector are included in the code. Where K=n, and n is the dimensionality of the feature vector, the global maximum of the vector code is returned, and K=1 follows a uniform distribution since no comparison is involved. The following is an analysis of the case in which 1<K<n.

For a window size K, the probability that max $\theta(c_j)$ over K elements lies at an index on or after j is given by $$P_K(\text{Rank}(O(c_j)) > j) = \frac{\binom{n-j}{k}}{\binom{n}{k}} \quad \text{(Equation 5)}$$

where j is an index that represents the positions in a sorted vector of dimensions. In order to derive $P_k(\text{Rank}(\Theta(c_i))=j)$ for $0 \leq j \leq n-K$ the difference of the cumulative distribution is determined and simplified, resulting in $$\frac{K}{n} \prod_{l=0}^{(K-1)} \left(1 - \frac{j}{n-l}\right) \quad \text{(Equation 6)}$$

FIGS. 4A and 4B plot $P_k(\text{Rank}(\Theta(c_i))=j)$ for different values of K. The value of K enables tuning to give higher weight to top elements in the vectors compared to other elements in the vectors. Assuming that multiple permutations are generated the final similarity function induced in the limit can be expressed as:

$$S_k(X, Y) = \frac{\sum_{i=0}^{n-1} \binom{R_1(X, Y)}{K-1}}{\binom{n}{k}} \quad \text{(Equation 7)}$$

where $R_i(X, Y)$ is given by Equations 3 and 4, discussed above.

If, i denotes indices into vectors X and Y, and θ(i) denotes indices into permuted vectors X' and Y', and if index i is chosen as the hash code for a given random permutation it implies, $X(i) > X(j) \; \forall \; j0 < \Theta(j) < K, J \neq i$, which means that all other indices in the permutation are members of the set L(X, i). If i is chosen as the hash code for both X and Y (e.g., for a fixed random permutation Θ), then the indices $0 < \Theta(j) < K$ belong to both L(X, i) and L(Y, i). By implication the number of ways codes for a permutation on vectors X and Y can collide on value i is given by:

$$N(X, Y, i) = \binom{L(X, i) \cap L(Y, i)}{K-1} \quad \text{(Equation 8)}$$
$$= \binom{R_i(X, Y)}{K-1}$$

The total number of ways codes for a permutation Θ on vectors X and Y can collide on any given code is given by:

$$N(X, Y) = \sum_i N(X, Y, i) \quad \text{(Equation 9)}$$
$$= \sum_i \binom{R_1(X, Y)}{K-1}$$

K leading indices of a permutation Θ can be drawn from n dimensions in $\binom{n}{K}$ ways.

Therefore, the probability of collision of codes given by a random permutation Θ on vectors X and Y can be expressed as:

$$S_K(X, Y) = \frac{\sum_{i=0}^{n-1} \binom{R_1(X, Y)}{K-1}}{\binom{n}{k}} \quad \text{(Equation 10)}$$

The foregoing demonstrates the locality sensitive hashing (LSH) properties for the codes where the probability of collision induces a family of distance functions that are approximated. $S_k(X, Y)$ can be interpreted as follows. The number of ways in which index i can be the maximum over a K-sized permutation is given by the number of ways in which K−1 elements can be selected that are smaller than the element at i, and common to both X and Y. K=2 yields a normalized version of Equation 2. For larger values of K, this family of hash functions prefers intersection sets with large cardinality (e.g., with the corresponding indices following distribution given by Equation 6). FIGS. 4A and 4B illustrate the nonlinear effect of K on amplifying $R_i(X, Y)$ for different values of K.

Figure 5:
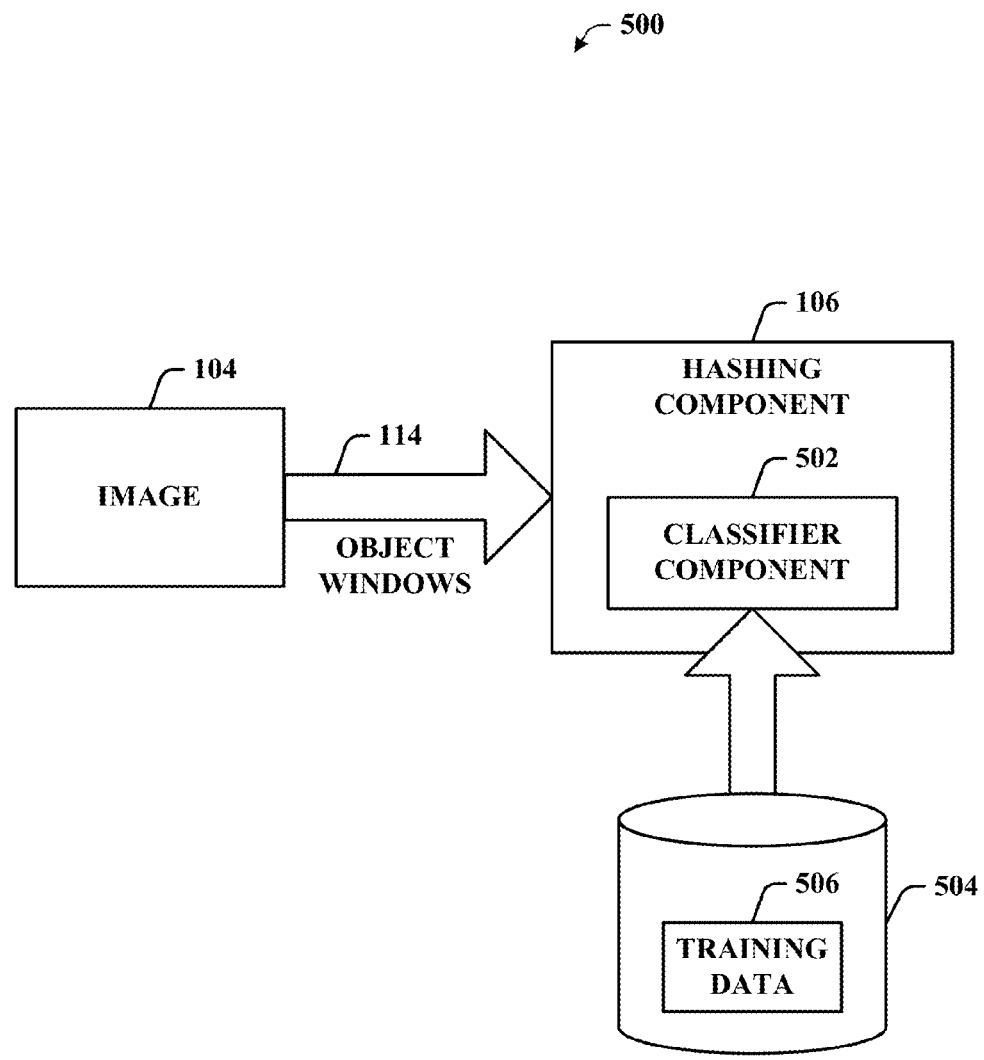
FIG. 5 illustrates an example hashing component in accordance with various aspects described herein.

Referring now to FIG. 5, illustrated is an example hashing component 106 in accordance with various aspects described in this disclosure. As discussed, the hashing component 106 computes a set of respective hash values for the set of object windows 112. The hashing component 106 can include a classifier component 502 that learns hash values optimized for recognition or localization of a specific object or a specific feature. The classifier component 502 can be a trained classifier that is trained via a set of training data 506 stored in one or more data stores, e.g., a data storage 504. For example, the classifier component can employ a Similarity Preserving algorithm for Entropy-based Coding (SPEC) hashing to learn a hash function with binary code such that objects with high similarity have small Hamming distance. The classifier component 502 can be incrementally trained (e.g., one bit at a time) via the set of training data 506, and as bits are added to the hash code the Hamming distance between dissimilar objects increases, enabling fast and efficient nearest neighbor retrieval.

Figure 6:
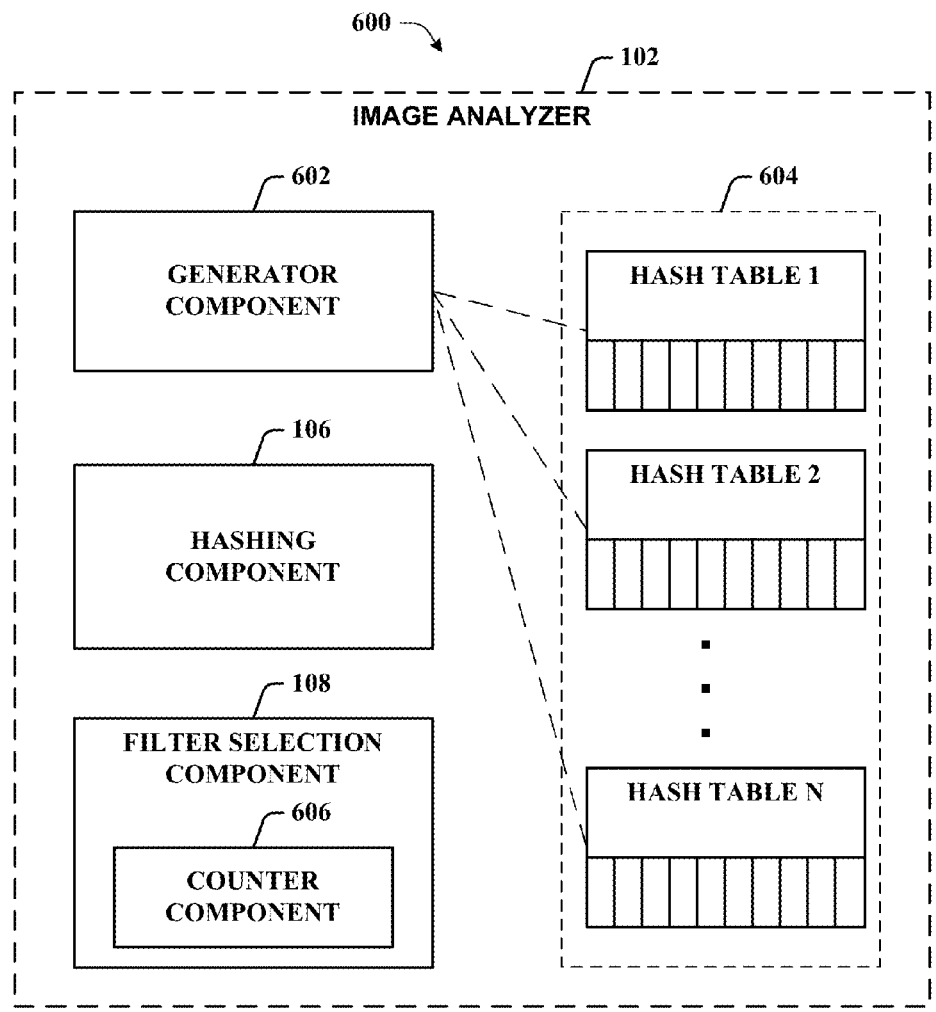
FIG. 6 illustrates an example system for filter based object detection using hash functions in accordance with various aspects described herein.

FIG. 6 illustrates an example system 600 for filter based object detection using hash functions in accordance with various aspects described in this disclosure. The system 600 includes an image analyzer 102 that recognizes or localizes features or objects included in an image 104. The image analyzer 102 includes a hashing component 106, a filter selection component 108, and a generator component 602. The hashing component 106 receives a set of object windows (W) 112 associated with the image 104, and computes a set of respective hash values for the set of object windows 112.

The generator component 602 constructs, provides, or otherwise generates a set of hash tables 604 (e.g., hash table 1-hash table N) for a set of object filters. The quantity of hash tables in the set of hash tables is determined as a function of the length of the hash values extracted by the hashing component 106, and hash values corresponding to the object filters are partitioned, split, or otherwise divided among the hash tables. For example, if the hashing component 106 extracts 100 bits, then the generator component 602 can construct 25 hash tables for four bits each.

The filter selection component 108 in FIG. 6 compares the set of respective hash values against the set of hash tables 604. Continuing with the previous example, the filter selection component 108 can compare the set of respective hash values against each of the 25 hash tables (e.g., set of hash tables 604).

The filter selection component 108 in FIG. 6 includes a counter component 606 that tracks, logs, or otherwise records a quantity of matches (e.g., hits, etc.) determined between the hash tables and the set of respective hash values. A match can be determined based on a hash value in the set of respective hash values satisfying a predetermined criterion, such as a threshold of bit matches. Returning again to the previous example, if a hash value in the set of respective hash values contains four bits that match the bits contained a hash table in the set of hash tables 604, then the counter component 606 records a match to the corresponding object filter for the hash value. The set of hash tables 604 and the counter component 606 enable a determination of accuracy or closeness of an input pass to the object filters, rather than strictly matching the hash values corresponding to the object window with the object filters. For example, a quantity of matches recorded by the counter component 606 can indicate a close match with one or more object filters maintained in the set of hash tables 604. It is to be further appreciated that although the generator component 602 and the set hash tables 604 are illustrated as being included in the image analyzer 102, such implementation is not so limited. For instance, the set of hash tables 604 can be maintained in a disparate location, wherein the image analyzer 102 accesses the set of hash tables 604 via a network connection.

Figure 7:
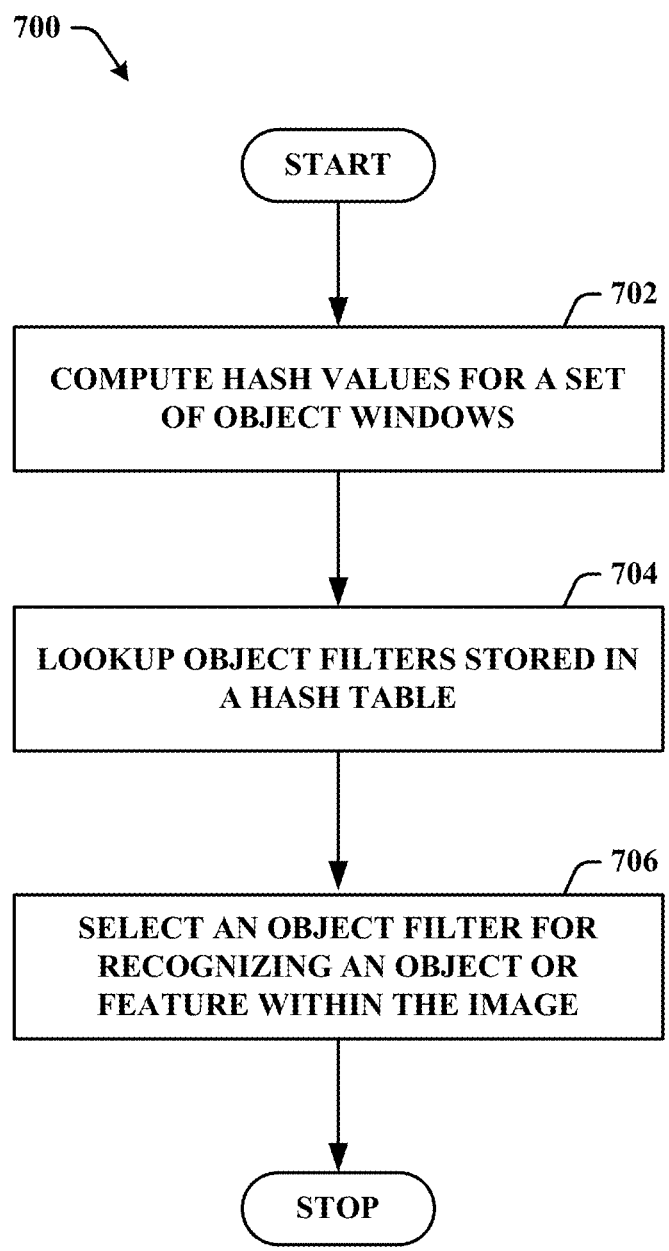
FIGS. 7-9 are example flow diagrams of respective methods filter based object detection using hash function in accordance with various aspects described herein.
Figure 8:
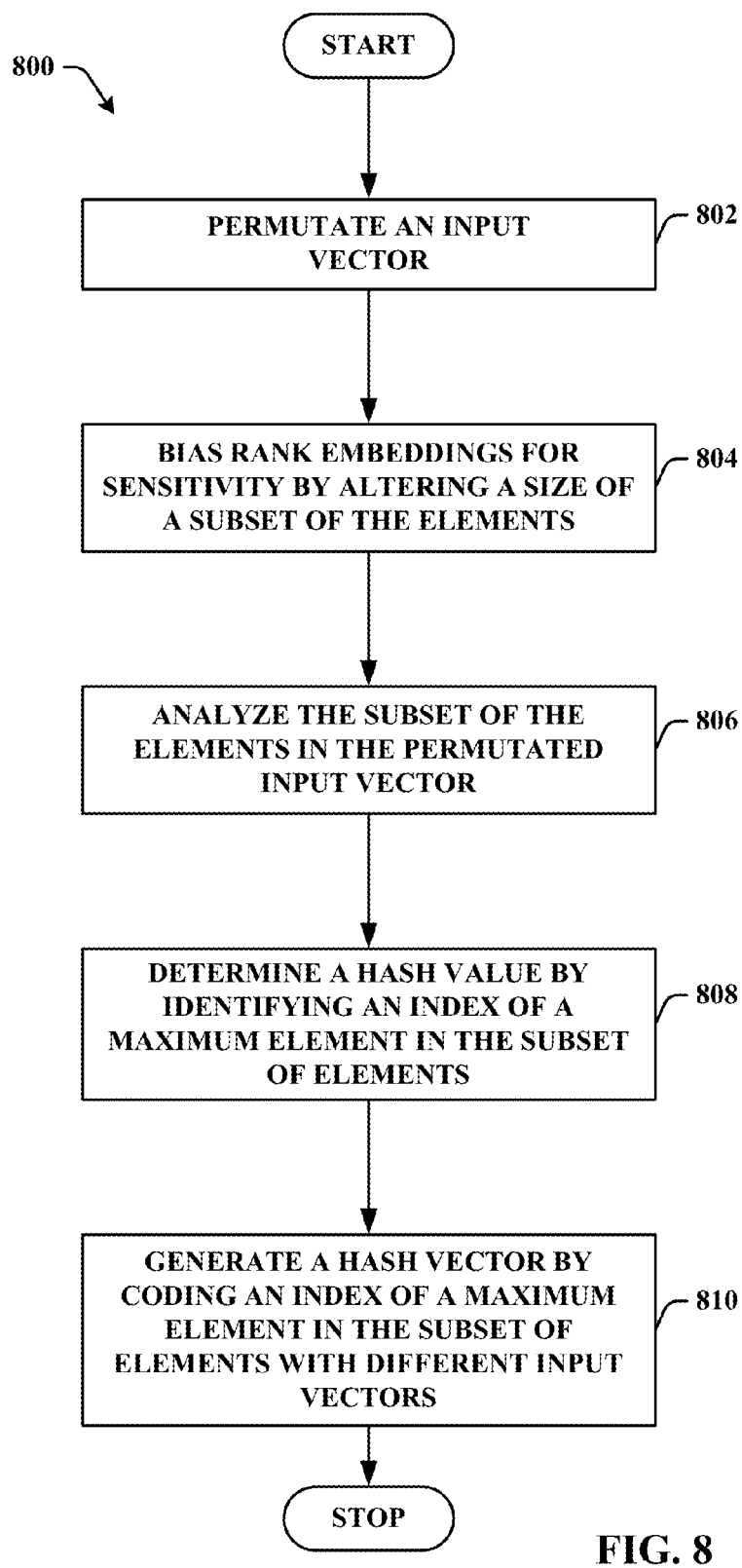
Figure 9:
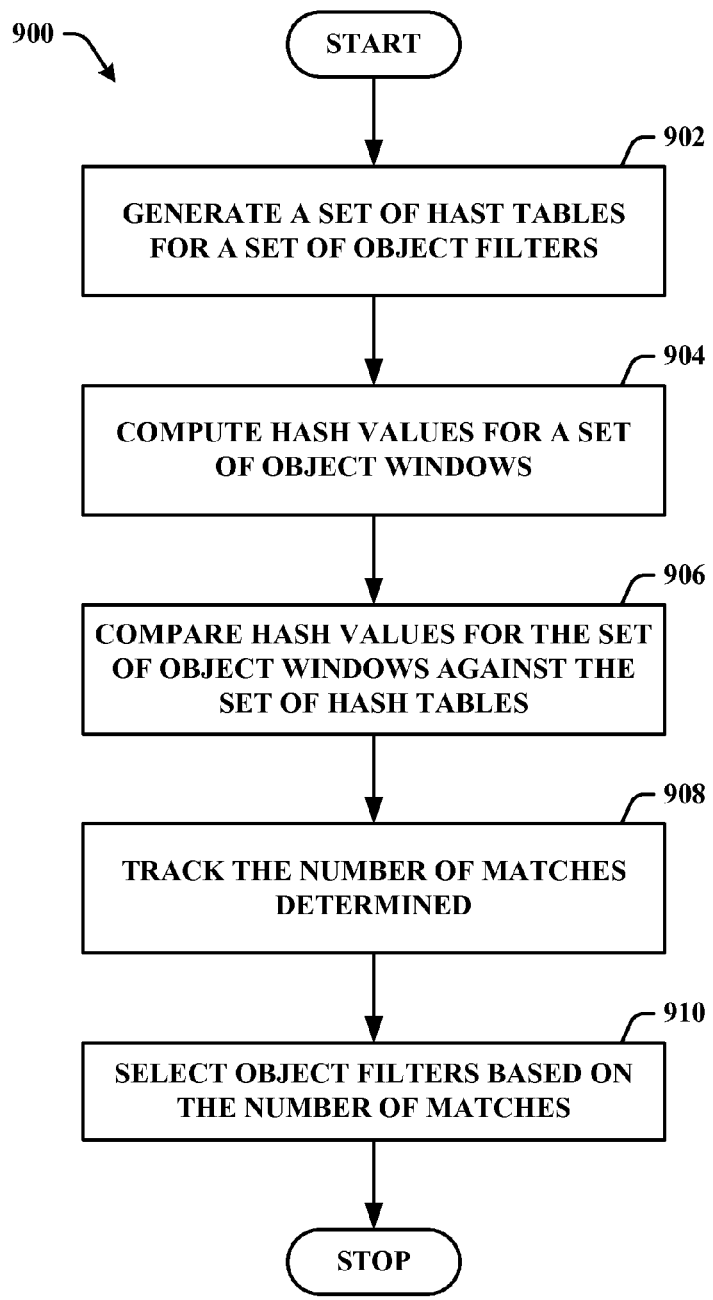

Non-Limiting Examples of Methods for Filter Based Object Detection Using Hash Functions FIGS. 7-9 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 7, illustrated is an example methodology 700 for filter based object detection using hash functions in accordance with various aspects described in this disclosure. At reference numeral 702, a set of hash values are calculated for a set of object windows, respectively (e.g., by hashing component 106). The object windows (e.g., object windows 112) are associated with an image (e.g., image 104). Various hash functions can be used to calculate the hash values, including, but not limited to, winner takes all (WTA) hashing (e.g., using WTA hash component 204), locality sensitive hashing function, hashing based on random projections, hashing with concomitant statistics, or Similarity Preserving algorithm for Entropy-based Coding (SPEC) hashing (e.g., using classifier component 502).

At reference numeral 704, the hash values (e.g., hash vector) are used to map, locate, or otherwise lookup one or more object filters in a hash table (e.g., using filter selection component 108). At reference numeral 706, one or more object filters are selected for object or feature recognition or localization in the image based on a match with the hash values (e.g., filter selection component 108). For example, if the hash values maps to an $N^{th}$ object filter in the hash table, then the $N^{th}$ object filter is selected for object recognition or localization in the image.

Turning to FIG. 8, illustrated is an example methodology 800 for winner takes all (WTA) hashing in accordance with various aspects described in this disclosure. At reference numeral 802, an input vector is permutated (e.g., using WTA hash component 204). The input vector can correspond to an object window, or section of an object window for an image to be scanned. For example, an input vector, X, can be permutated to obtain a permutated input vector, X'. At reference numeral 804, rank embeddings are biased by altering a size (e.g., K) of the subset of elements to be analyzed for hash value generation (e.g., using ranking component 206). As discussed, the greater the size (e.g., K) of the subset of feature dimensions, the greater the bias is toward the elements at the head of the rank list.

At reference numeral 806, the subset of elements in the permutated input vector (e.g., X') are analyzed (e.g., using WTA hash component 204), wherein the size (e.g., K) of the subset of elements was determined at reference numeral 804. At reference numeral 808, a maximum element in the subset of elements is identified (e.g., using WTA hash component 204). For example, if the subset of elements contains (5, 12, 2, 3), then 12 is identified as the maximum element in the subset of elements, and the index of 12 in the subset of elements is 1, therefore, the hash value is 1. At reference numeral 810, a hash vector is generated by combining the hash value of the input vector with a set of hash values for different input vectors (e.g., using WTA hash component 204). As discussed above, the hash values or hash vector can be used to lookup one or more object filters in an object table for object or feature recognition or localization. It is to be appreciated that the WTA hashing of methodology 800 is based on comparisons of elements, and therefore can be efficiently implemented without computing floating point units. For example, the methodology 800 can be implemented by employing special case hardware that does not compute floating point units, or fixed-point hardware (e.g., fixed point processor, etc.).

FIG. 9 illustrates an example methodology 900 for filter based object detection using hash functions in accordance with various aspects described in this disclosure. At reference numeral 902, a set of hash tables are generated for a set of object filters (e.g., using generator component 602). A quantity of hash tables in the set of hash tables can be determined as a function of the length of hash values extracted from object windows corresponding to an image (e.g., using the hashing component 106), and hash values corresponding to the object filters divided among the set of hash tables. For example, if the hash values extracted contain 100 bits, then 25 hash tables for four bits each can be generated.

At reference numeral 904, a set of hash values are computed for a set of object windows, respectively, that correspond to an image (e.g., using hashing component 106). The hash values can be computed by using various hash functions, including, but not limited to, winner takes all (WTA) hashing, locality sensitive hashing function, hashing based on random projections, hashing with concomitant statistics, or Similarity Preserving algorithm for Entropy-based Coding (SPEC) hashing (e.g., using classifier component 502).

At reference numeral 906, the set of respective hash values are compared against the set of hash tables (e.g., using filter selection component 108). Continuing with the previous example, the set of respective hash values can be compared against each of the 25 hash tables. At reference numeral 908, a quantity (e.g., number) of the respective hash values corresponding to one or more object filters in the set of hash tables is tracked (e.g., using counter component 606). Returning again to the previous example, if a hash value in the set of respective hash values contains four bits that match the bits contained in a hash table for an object filter, then a match is recorded for the hash value.

At reference numeral 910, an object filter is selected as function of the number of matches recorded. The quantity of matches can indicate a close match with one or more object filters maintained in the set of hash tables, and at least one object filter can be selected based on a predetermined criterion, such as satisfying a quantity of matches threshold.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of this disclosure.

Figure 10:
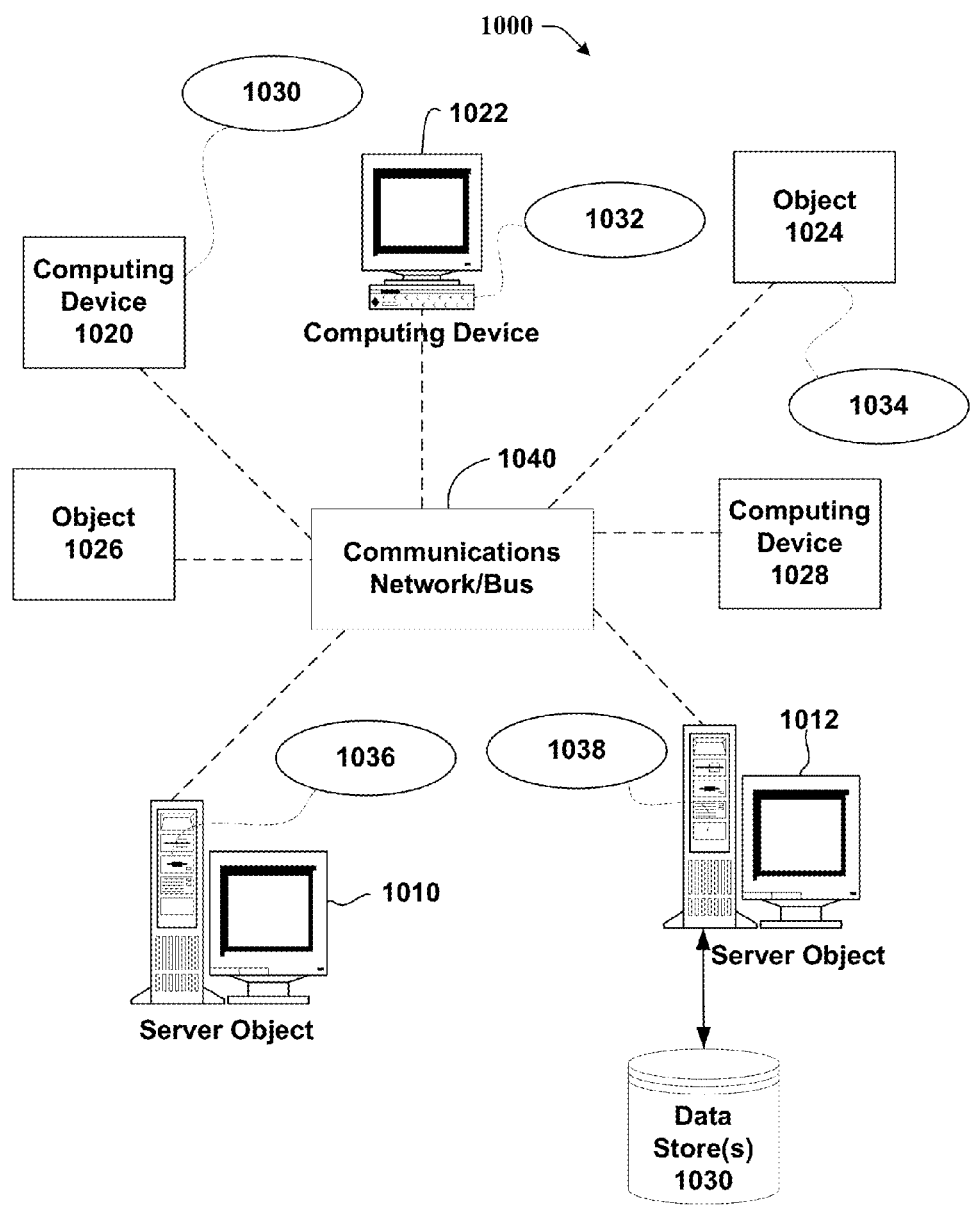
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the smooth streaming provided in accordance with various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
a memory storing computer executable components; and
a processor configured to execute the following computer executable components stored in the memory:
a hashing component configured to compute respective hash values for a set of object windows that are associated with an image to be scanned; and
a filter selection component configured to compare the respective hash values of object windows in the set of object windows against a hash table of object filters, and as a function of the comparison to select at least one object filter for recognizing or localizing at least one of an object or a feature within the image.

2. The system of claim 1, wherein the hashing component is configured to employ a winner takes all (WTA) hash function that transforms an input feature space into binary codes such that Hamming distance in a resulting space correlates with rank similarity measures.

3. The system of claim 2, further comprising a ranking component configured to bias rank embeddings to be sensitive to elements at a head of a rank list.

4. The system of claim 3, wherein the rank embeddings are based on partial orderings of elements in vectors associated with object windows in the set of object windows.

5. The system of claim 3, wherein the ranking component is configured to induce ranking metrics on descriptors for similarity search.

6. The system of claim 1, wherein the hashing component is configured to generate a hash vector by combining a set of hash values respectively corresponding to different input feature vectors.

7. The system of claim 1, further comprising a hash table component configured to store the object windows in the hash table.

8. The system of claim 1, further comprising a classifier component configured to learn hash codes optimized for recognition or localization of at least one of a specific object or a specific feature.

9. The system of claim 1, wherein the processor is at least one of a special case processor that does not compute floating point units, or a fixed-point processor.

10. The system of claim 1, wherein the set of object windows that are associated with an image to be scanned are determined as a function of the image.

11. The system of claim 1, wherein the at least one object filter is selected prior to recognizing or localizing the at least one of an object or a feature within the image.

12. A system, comprising:
a memory storing computer executable components; and
a processor configured to execute the following computer executable components stored in the memory:
a hashing component configured to compute respective hash values for a set of object windows that are associated with an image to be scanned; and a filter selection component configured to compare the respective hash values of object windows in the set of object windows against a hash table of object filters, and as a function of the comparison to select at least one object filter for recognizing or localizing at least one of an object or a feature within the image, wherein multiple partial orderings of a data point are correlated to lower bound ranking agreement in event of a match.

13. A method, comprising:
employing a processor to execute computer executable components stored in memory to perform the following acts:
computing a set of respective hash values for a set of object windows that are associated with an image to be scanned; and
comparing the set of respective hash values of the set of object windows against a hash table of object filters, and as a function of the comparison selecting at least one object filter for recognizing or localizing at least one of an object or a feature within the image.

14. The method of claim 13, wherein the computing the set of respective hash values for the set of object windows, includes employing a winner takes all (WTA) hash function that transforms an input feature space into binary codes such that Hamming distance in a resulting space correlates with rank similarity measures.

15. The method of claim 14, further comprising biasing rank embeddings to be sensitive to elements at a head of a rank list.

16. The method of claim 15, wherein biasing rank embeddings, includes biasing partial orderings of elements in vectors associated with the object windows.

17. The method of claim 13, further comprising generating a hash vector by combining a set of hash values corresponding to different input feature vectors.

18. The method of claim 13, further comprising learning hash codes to recognize or localize at least one of a specific object or a specific feature.

19. The method of claim 13, further comprising storing the object windows in the hash table.

20. A method, comprising:
employing a processor to execute computer executable components stored in memory to perform the following acts:
computing a set of respective hash values for a set of object windows that are associated with an image to be scanned;
comparing the set of respective hash values of the set of object windows against a hash table of object filters, and as a function of the comparison selecting at least one object filter for recognizing or localizing at least one of an object or a feature within the image; and
correlating multiple partial orderings of a data point to lower bound ranking agreement in event of a match.

21. A system, comprising:
a memory storing computer executable components; and
a processor configured to execute the following computer executable components stored in the memory:
a generator component configured to generate a set of hash tables for a set of object filters;
a hashing component configured to compute respective hash values for a set of object windows that are associated with an image to be scanned;
a filter selection component configured to compare the respective hash values of the set of object windows against the set of hash tables; and
a counter component configured to record a quantity of matches of the respective hash values with the set of hash tables as a function of the comparison.

22. The system of claim 21, wherein the filter selection component is configured to choose at least one object filter in the set of object filters for recognizing or localizing at least one of an object or a feature within the image as a function of the quantity of matches.

23. The system of claim 21, wherein the hashing component is configured to generate a hash vector by combining a set of hashes respectively corresponding to different input feature vectors.

24. The system of claim 21, wherein the hashing component is configured to employ a winner takes all (WTA) hash function that transforms an input feature space into binary codes such that Hamming distance in a resulting space correlates with rank similarity measures.

25. The system of claim 24, further comprising a ranking component configured to bias rank embeddings to be sensitive to elements at a head of a rank list.

26. The system of claim 25, wherein the rank embeddings are based on partial orderings of elements in vectors associated with the object windows.

27. The system of claim 21, further comprising a classifier component configured to learn hash codes optimized for recognition or localization of at least one of a specific object or a specific feature.

28. A system comprising:
a memory storing computer executable components; and
a processor configured to execute the following computer executable components stored in the memory:
a generator component configured to generate a set of hash tables for a set of object filters;
a hashing component configured to compute respective hash values for a set of object windows that are associated with an image to be scanned;
a filter selection component configured to compare the respective hash values of the set of object windows against the set of hash tables; and
a counter component configured to record a quantity of matches of the respective hash values with the set of hash tables as a function of the comparison, wherein multiple partial orderings of a data point are correlated to lower bound ranking agreement in event of a match.

29. A method, comprising:
employing a processor to execute computer executable components stored in memory to perform the following acts:
generating a set of hash tables for a set of object filters;
computing a set of respective hash values for a set of object windows that are associated with an image to be scanned;
comparing the set of hash values for the set of object windows against the set of hash tables; and
counting a number of matches of the respective hash values with the set of hash tables as a function of the comparison.

30. The method of claim 29, further comprising selecting at least one object filter in the set of object filters for recognizing or localizing at least one of an object or a feature within the image as a function of the number of matches.

31. The method of claim 29, wherein the computing the set of respective hash values for the set of object windows, includes employing a winner takes all (WTA) hash function that transforms an input feature space into binary codes such that Hamming distance in a resulting space correlates with rank similarity measures.

32. The method of claim 31, further comprising biasing rank embeddings to be sensitive to elements at a head of a rank list.

33. The method of claim 32, wherein biasing the rank embeddings includes biasing partial orderings of elements in vectors associated with the object windows.

34. The method of claim 29, further comprising learning hash codes to recognize or localize at least one of a specific object or a specific feature.

35. The method of claim 29, wherein employing the processor includes at least one of employing a special case processor that does not compute floating point units, or employing a fixed-point processor.

36. A method, comprising:
   employing a processor to execute computer executable components stored in memory to perform the following acts:
      generating a set of hash tables for a set of object filters;
      computing a set of respective hash values for a set of object windows that are associated with an image to be scanned;
      comparing the set of hash values for the set of object windows against the set of hash tables;
      counting a number of matches of the respective hash values with the set of hash tables as a function of the comparison; and
      correlating multiple partial orderings of a data point to lower bound ranking agreement in event of a match.

* * * * *